United States Patent [19]
Cook

[11] Patent Number: 5,195,205
[45] Date of Patent: Mar. 23, 1993

[54] DOCK LEVELER OPERATING APPARATUS

[75] Inventor: Bobby A. Cook, Malvern, Ark.

[73] Assignee: Dock Leveler Manufacturing, Inc., Malvern, Ark.

[21] Appl. No.: 645,609

[22] Filed: Jan. 25, 1991

[51] Int. Cl.$^5$ .............................................. E01D 1/00
[52] U.S. Cl. .................................................... 14/71.1
[58] Field of Search .......................... 404/71.1, 71.3; 244/137.1; 182/156

[56] References Cited

U.S. PATENT DOCUMENTS

| | | | |
|---|---|---|---|
| 3,327,335 | 6/1967 | Beckwith et al. | 14/71 |
| 3,409,922 | 11/1968 | Beckwith et al. | |
| 3,460,175 | 8/1969 | Beckwith et al. | 14/71 |
| 3,468,861 | 9/1969 | Tietz et al. | 260/88.7 |
| 3,486,181 | 12/1969 | Hecker, Jr. et al. | 14/71 |
| 3,553,756 | 1/1971 | Hecker, Jr. et al. | 14/71 |
| 3,583,014 | 6/1971 | Brown et al. | 14/71 |
| 3,628,209 | 12/1971 | Parent et al. | 14/71 |
| 3,636,578 | 1/1972 | Dieter | 14/71 |
| 3,685,077 | 8/1972 | Wiener et al. | 14/71 |
| 3,933,256 | 1/1976 | Fagerlund | 14/71.1 X |
| 3,974,537 | 8/1976 | Ellis et al. | 14/71.3 |
| 4,010,505 | 3/1977 | Bouman | 14/71.3 |
| 4,065,824 | 1/1978 | Ellis et al. | 14/71.3 |
| 4,257,137 | 3/1981 | Hipp et al. | 14/71.3 |
| 4,325,155 | 4/1982 | Alten | 14/71.1 |
| 4,420,849 | 12/1983 | Alten | 14/71.1 X |
| 4,525,887 | 7/1985 | Erlandsson et al. | 14/71.1 X |
| 4,665,579 | 5/1987 | Bennett et al. | 14/71.1 |
| 4,689,846 | 9/1987 | Sherrod | 14/71.3 |
| 4,935,979 | 6/1990 | Walker et al. | 14/71.1 |

OTHER PUBLICATIONS

Specification sheet for a dock leveler made by Blue Giant, date unknown.
Product literature for Bluff's "Bluff Ratchet Riser", date unknown.
Product literature for Pioneer's "Bar Lift", date unknown.

*Primary Examiner*—Ramon S. Britts
*Assistant Examiner*—Nancy Connolly
*Attorney, Agent, or Firm*—Finnegan, Henderson, Farabow, Garrett & Dunner

[57] ABSTRACT

An apparatus for operating a dock leveler including a linkage pivotably connected at a first end to the base plate. The second end of the linkage is adapted to selectively engage the center plate at times when the center plate is pivoted from its forward position toward its rearward position. Preferably, the second end of the linkage includes a roller apparatus to roll along the underside of the center plate during the pivoting operation. A lever tube is rigidly connected to the second end of the linkage and is adapted to hold an operating lever. The operating lever is in a substantially vertical orientation at times when the center plate is in the stored and bridging positions. When the center plate is in the retracted position, the operating lever is adapted to be in a position that is easily reachable by the operator with only a minimal degree of bending required.

21 Claims, 9 Drawing Sheets

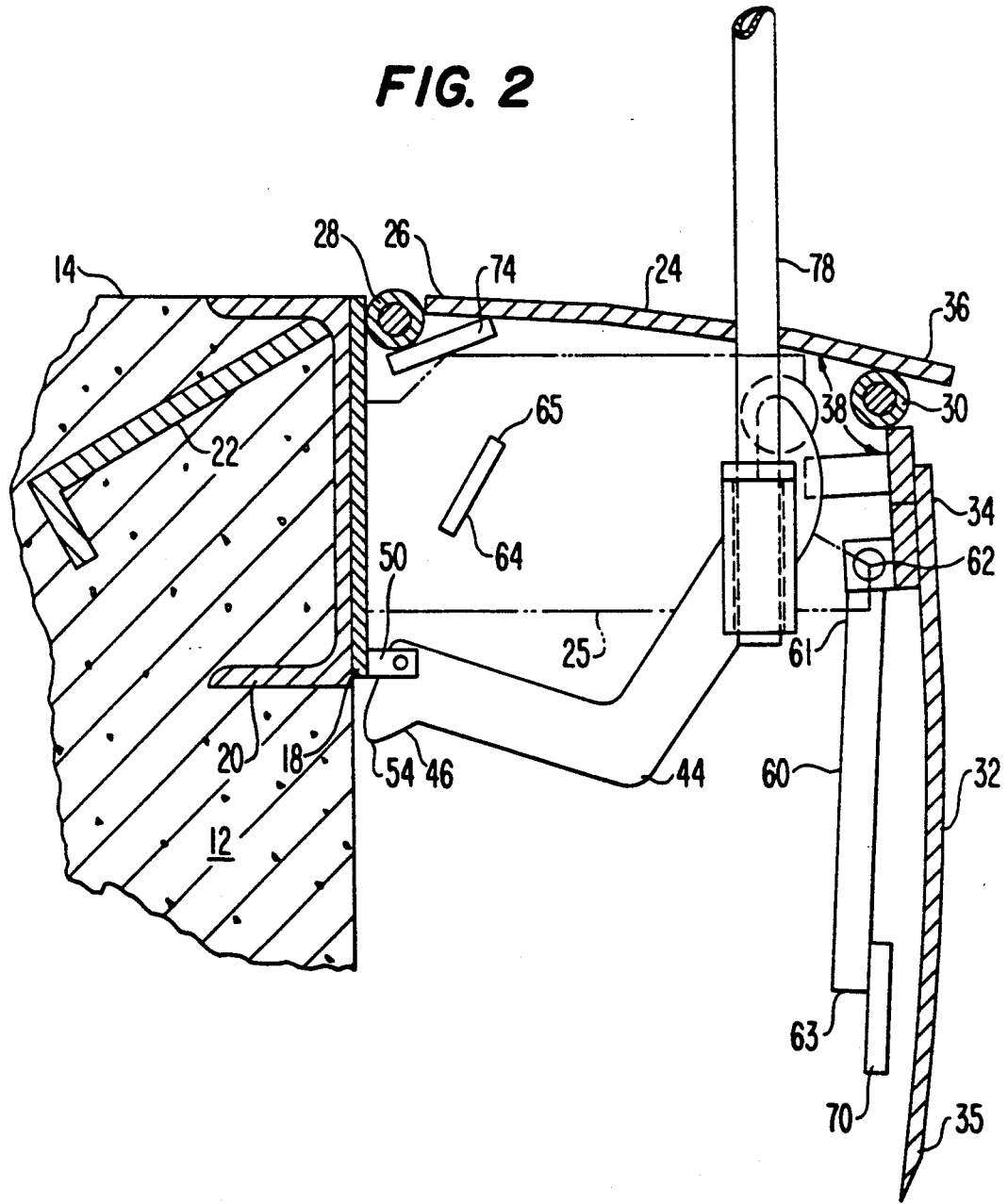

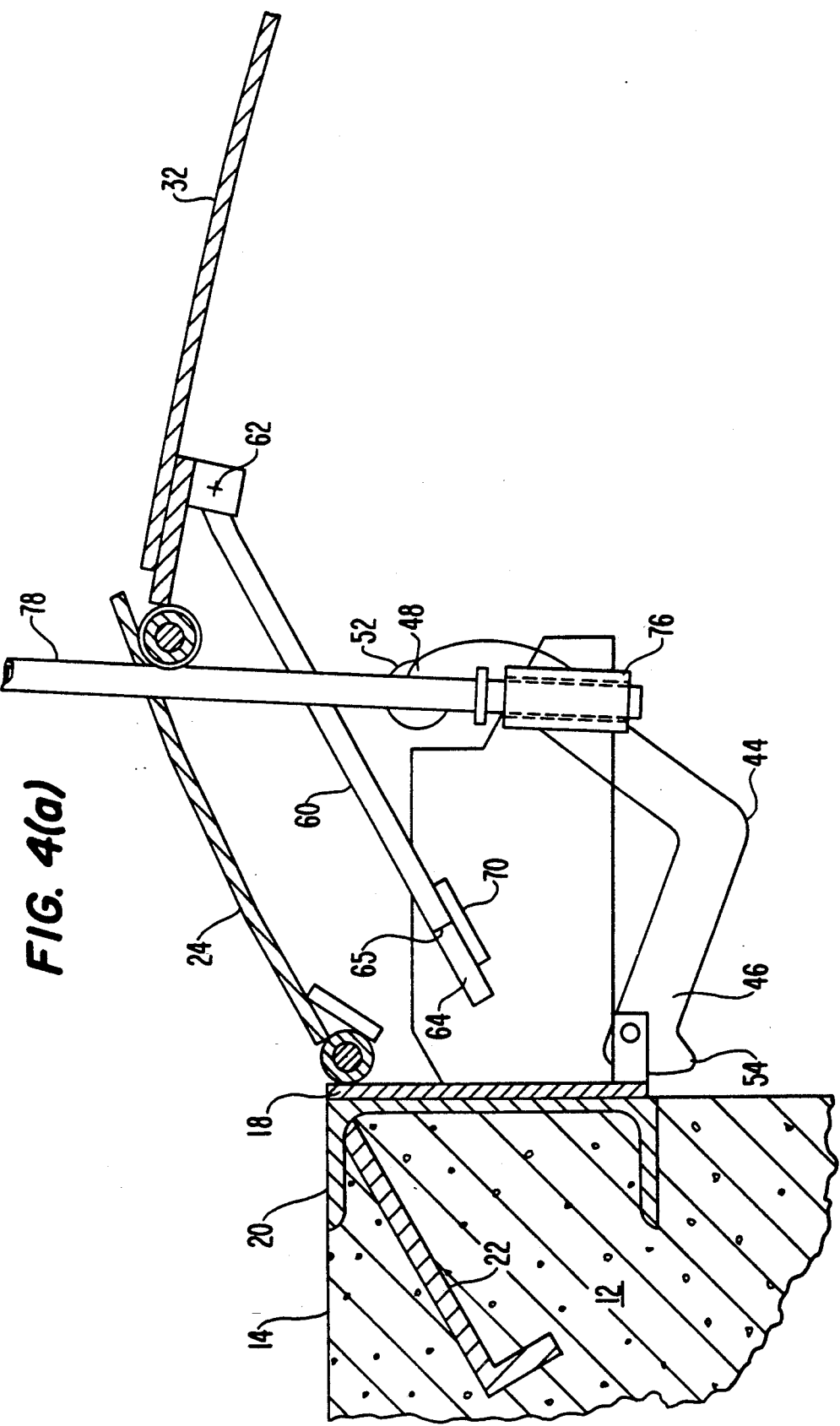

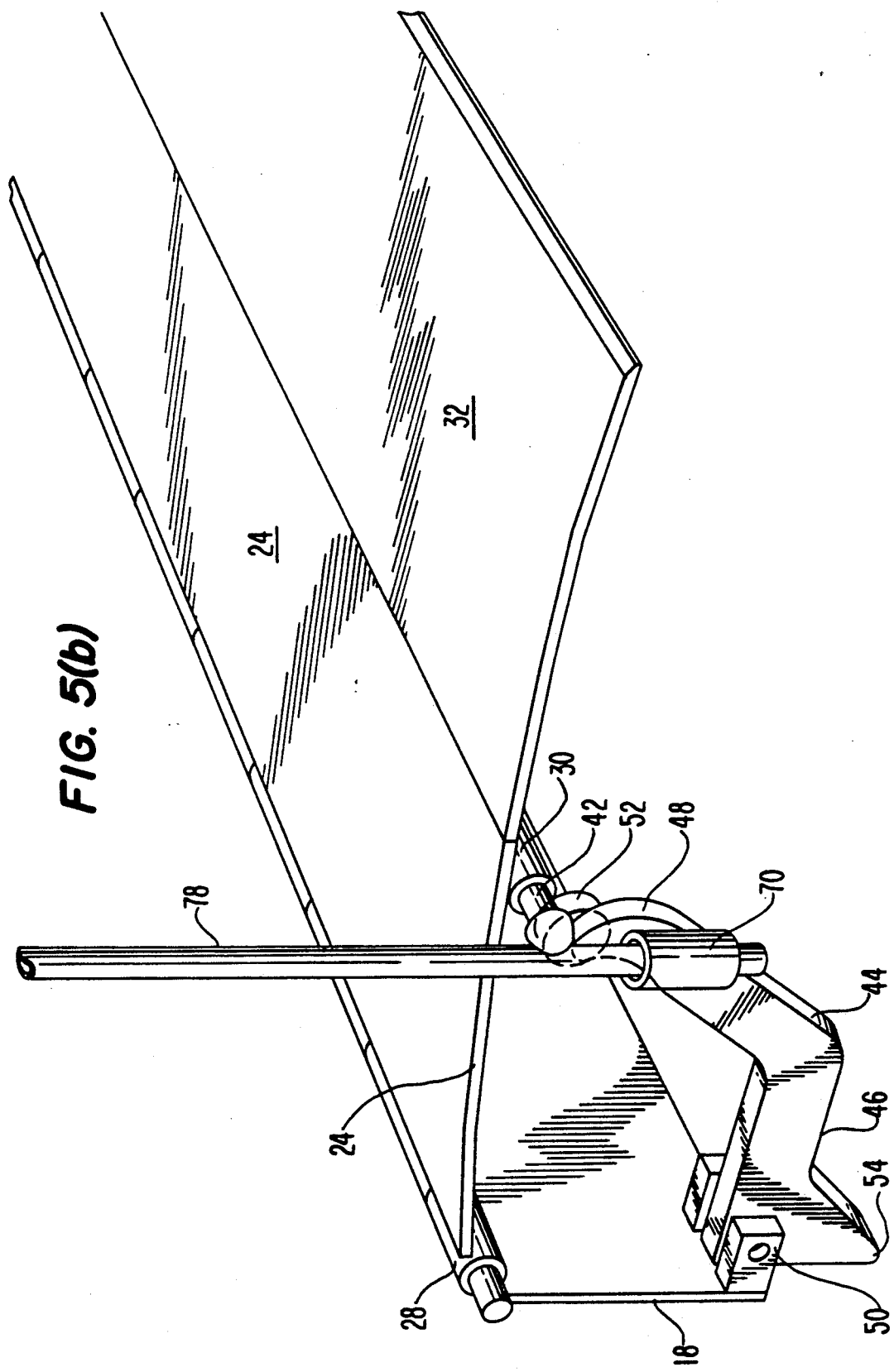

DOCK LEVELER OPERATING APPARATUS

BACKGROUND OF THE INVENTION

1. Field of the Invention

This invention relates to an edge-of-dock leveler which acts as a bridge between a loading dock platform and the bed of a carrier and, more particularly, to an apparatus for operating an edge-of-dock leveler for positioning the dock leveler at selected positions relative to an adjacent loading dock platform.

2. Description of Related Art

Dock levelers for bridging a gap between a loading dock platform and a carrier bed are in widespread use for facilitating the loading and unloading of various types of carriers. Forklift trucks are often required to move from a loading dock directly into and out of the storage compartment of a carrier. In order to facilitate such an operation, dock levelers are used to compensate for any height variation which exists between a loading dock platform and the bed of a carrier.

Typically, an edge-of-dock leveler will have a center plate which pivots relative to an adjacent loading dock platform and a lip plate which pivots relative to the center plate. The lip plate will rest directly on the bed of a carrier when a dock leveler is positioned as a bridge. The manual effort required to pivot the center plate and lip plate is often reduced by the use of counterbalance spring mechanisms which are employed to assist in positioning the plates. For example, U.S. Pat. No. 4,665,579 discloses a counterbalance mechanism for an edge-of-dock leveler.

To prevent an operator from injuring his back and to eliminate the lifting effort required to position the dock leveler, a prior art system has been developed that does not require an operator to actually lift the center or lip plates. Instead, an apparatus is utilized so that an operator can position the dock leveler with a push/pull motion. Such an apparatus is disclosed in U.S. Pat. No. 4,689,846.

A problem created by the use of a push/pull apparatus, such as that disclosed in U.S. Pat. No. 4,689,846, is that the operating lever is typically positioned in an awkward manner when the dock leveler is in the stored or bridging positions. This requires that the operator lean over the dock to grasp the operating lever and initially move the dock leveler from the stored or bridging positions. Because the operator is forced to lean over the dock to grasp the operating lever, the operator is at risk of losing his balance and falling over the loading dock. Additionally, the operator is more susceptible to back strain and other back injuries resulting from the awkward positioning of the operating lever.

In addition to the awkward forward position of the operating lever when the dock leveler is in the bridging or stored positions, the operating lever is similarly in an awkward position when the center plate is pivoted to its full rearward position. Specifically, when the center plate is in the full rearward position, the operating lever is typically at a very low angle with respect to the loading dock platform. The operating lever is essentially flush with the ground. This requires that the operator bend over to grasp and hold the operating lever. Again, such a system renders the operator vulnerable to back injuries.

To minimize the need for an operator to bend over to grasp the operating handle when the dock leveler is in the rearward position, it is known to utilize a bent operating lever which has an upper portion angled toward the operator. Such bent operating levers, however, exacerbate the awkward position of the operating lever at times when the dock leveler is in the stored or bridging positions.

SUMMARY OF THE INVENTION

Accordingly, it is a primary object of this invention to provide a push/pull apparatus for operating a dock leveler which enables an operator to operate the device without being susceptible to back injuries.

It is a further object of this invention to provide a push/pull apparatus for operating a dock leveler which positions the operating lever in a substantially vertical position when a dock leveler is stored so that the operator is not forced to lean over the loading dock in order to grasp the operating lever.

To achieve the foregoing objects in accordance with the purposes of the invention as embodied and broadly described herein, the dock leveler of this invention comprises a base plate to be attached to the loading dock. A center plate is provided having a first edge pivotably connected to the base plate for pivotal movement in rearward and forward directions between a rearward position and a forward position. A lip plate is further provided having a first edge pivotably connected to the second edge of the center plate for pivotal movement between a retracted position, a stored position, and a bridging position in which the lip plate is substantially coplanar with and forms an extension of the center plate. Additionally, a center plate pivoting means is provided which is pivotably connected to the base plate for pivoting the center plate from the forward position to the rearward position. Lip plate extension means are provided for pivoting the lip plate toward the bridging position as the center plate pivots forward from the rearward position.

Preferably, the center plate pivoting means includes a unitary linkage having a first and second end, the first end being pivotably connected to the base plate and the second end being adapted to selectively engage the center plate and to move between the first and second opposite edges of the center plate as the center plate is pivoted from the forward position to the rearward position. In a preferred embodiment of the present invention, the second end of the linkage includes a roller adapted to roll along the underside of the center plate between the first and second opposite edges as the center plate is pivoted to the rearward position. Preferably, the operating lever is in a substantially vertical orientation at times when the center plate is in either the bridging or stored positions.

In another aspect of the invention, an apparatus for operating the dock leveler of the type just described is provided. The apparatus comprises center plate pivoting means pivotably connected to the base plate for pivoting the center plate from the forward position to the rearward position. During the pivoting of the center plate to the rearward position, the lip plate pivots to the retracted position. Lip plate extension means are provided for pivoting the lip plate toward the bridging position as the center plate is pivoted forward from the rearward position.

The accompanying drawings, which are incorporated in and constitute a part of this specification, illustrate one embodiment of the invention and together

BRIEF DESCRIPTION OF THE DRAWINGS

FIG. 2 is a sectional side view illustrating the dock leveler shown in FIG. 1 in a stored position;

FIG. 4(a) is a sectional side view of the dock leveler shown in FIG. 1 as the dock leveler moves from the position shown in FIG. 3(a) towards its bridging position;

FIG. 5(b) is a perspective view illustrating the position of the operating apparatus of the present invention at times when the dock leveler is in the position shown in FIG. 5(a)

DESCRIPTION OF THE PREFERRED EMBODIMENTS

Figure 1:
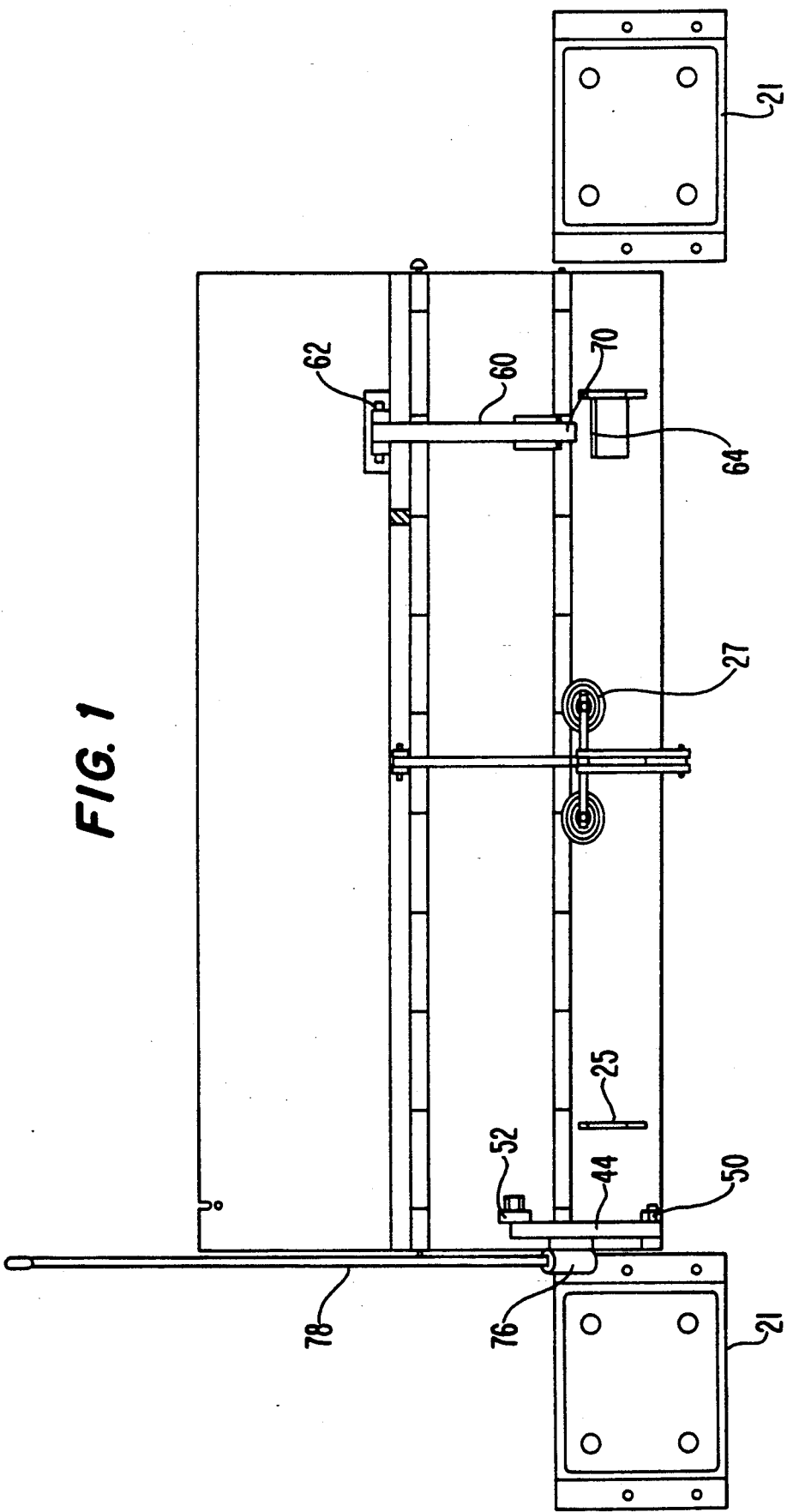
FIG. 1 is a front plan view of a dock leveler made in accordance with the present invention, in a full upright position.

The preferred embodiments of the dock leveler of the present invention is shown in FIGS. 1-6 and is represented generally by the reference numeral 10. Referring now to FIG. 5(a), it can be seen that dock leveler 10 is adapted to be located on the edge of loading dock 12 to bridge the gap between the loading dock platform 14 and carrier bed 16.

In accordance with the present invention, the dock leveler includes a base plate to be attached to the loading dock. As embodied herein, dock leveler 10 includes base plate 18 to be attached to loading dock 12. Base plate 18 is secured to loading dock 12 by dock edge channel iron 20 and anchor 22. Loading dock 12 is typically of concrete construction and dock edge channel iron 20 and anchor 22 are typically embedded in the concrete structure. It is also possible to make base plate 18 integral with dock edge channel iron 20 by using the face of channel iron 20 as the base plate. Bumper blocks 21 (shown only in FIG. 1) are positioned on both sides of base plate 18 to stop trucks from backing into loading dock 12.

In accordance with the present invention, the dock leveler includes a center plate having first and second opposite edges. The first edge is pivotably connected to the base plate for pivotal movement in rearward and forward directions between a rearward position and a forward position. As embodied herein, dock leveler 10 includes center plate 24 having a substantially planar upper surface over which a forklift truck or the like may move during unloading or loading of carrier bed 16. A first edge 26 of center plate 24 is pivotably connected to base plate 18 by hinge 28 allowing center plate 24 to pivot about hinge 28 between a rearward position illustrated in FIG. 3(a) and a forward stored position illustrated in FIG. 2. Center plate 24 includes a second edge 36 which is preferably parallel to first edge 26. When center plate 24 is in the forward position, it is supported by support gussets 25 which are connected to base plate 18. Support gussets 25 have been omitted from certain figures for clarity.

In accordance with the present invention, the dock leveler includes a lip plate having first and second opposite edges. The first edge of the lip plate is pivotably connected to the second edge of the center plate for pivotal movement between a retracted position, a stored position, and a bridging position in which the lip plate is substantially coplanar with and forms an extension of the center plate. As embodied herein, dock leveler 10 includes lip plate 32 which is pivotably connected by hinge 30 at a first edge 34 to second edge 36 of center plate 24. Lip plate 32 is adapted to move between a retracted position shown in FIG. 3(a) in which the lip plates forms an acute angle 33 With the center plate, a stored position shown in FIG. 2 in which the lip plates forms a substantially right angle 38 with the center plate, and a bridging position shown in FIG. 5(a) in which lip plate 32 is substantially coplanar with and forms an extension of center plate 24. As embodied herein, the substantially right angle 38 of lip plate 32 with center plate 24 is approximately 105° and the acute angle 33 of lip plate 32 with center plate 24 is approximately 60°. Lip plate 32 includes a second edge 35 which is preferably parallel to first edge 34.

In the embodiment shown in the accompanying drawings, a button head rivet 42 is disposed in the hinge 30. Rivet 42 has an approximately 1¼ inch outer diameter and extends outward of hinge tube 30 approximately 2 inches. Such rivets are utilized on virtually all edge-of-dock levelers as a structure onto which an operator can latch a hook for pivoting the dock leveler in the rearward direction.

Preferably a counterbalance spring mechanism 27 as shown in FIG. 1 is utilized to reduce the force required to position dock leveler 10. Counterbalance spring mechanism 27 exerts an upward force on center plate 24 and lip plate 32. Counterbalance spring mechanism 27 may be a dual extension spring mechanism, which is well known in the art. For example, such a mechanism is used on the dock leveler shown and described in U.S. Pat. No. 4,689,846, which is incorporated by reference in this specification. Accordingly, the details of counterbalance spring mechanism 27 will not be further described.

Figure 3A:
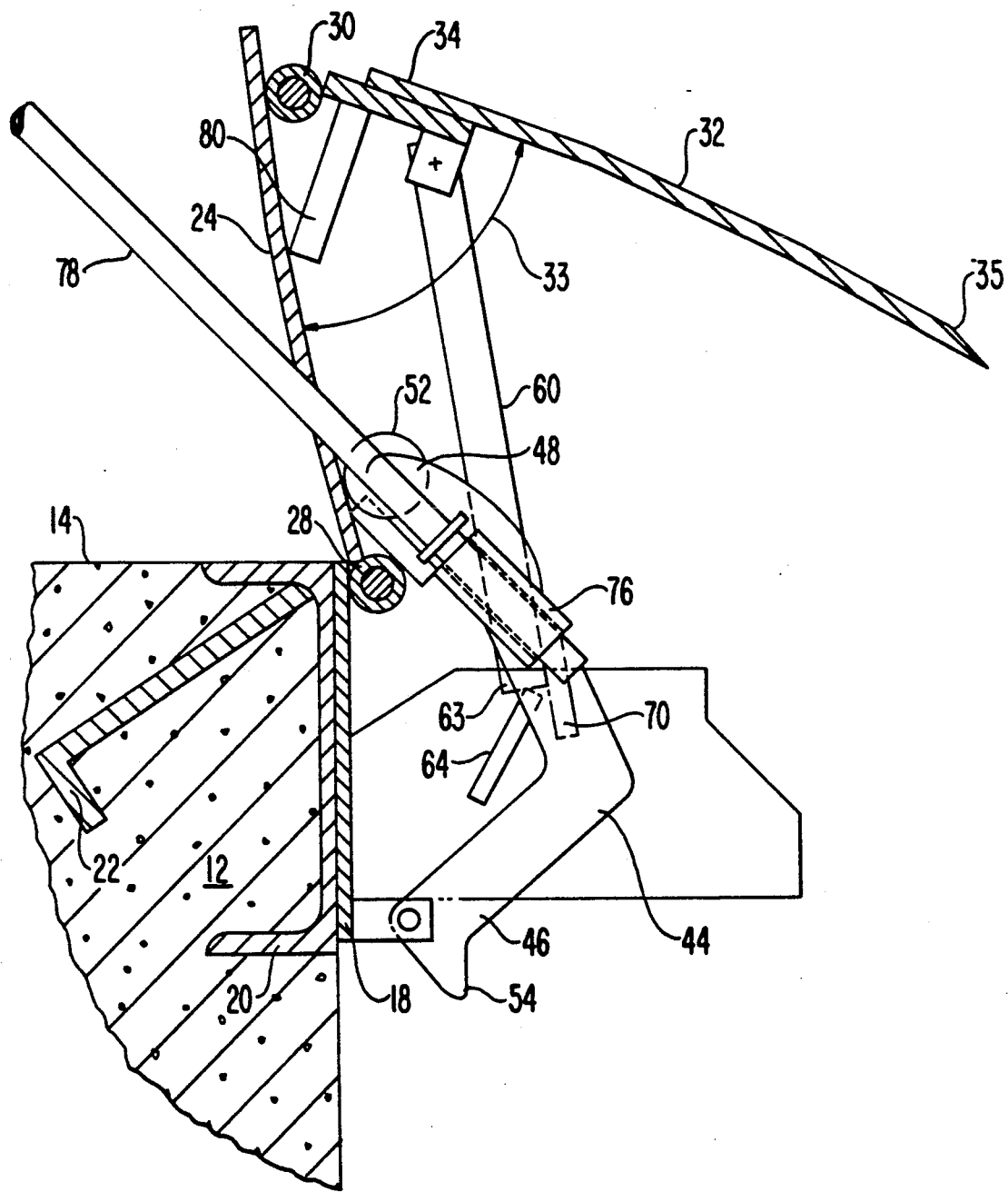
FIG. 3(a) is a sectional side view illustrating the dock leveler shown in FIG. 1 when the center plate is in its rearward position and the lip plate is in its retracted position.

Further in accordance with the present invention, the dock leveler includes a center plate pivoting means pivotably connected to the base plate for pivoting the center plate from the forward position to the rearward position. The lip plate pivots to the retracted position during the pivoting of the center plate to the rearward position. This arrangement is shown in FIG. 3(a). As shown in FIG. 3(a), a support bar 80 connected to the underside of lip plate 32 engages center plate 24 when center plate 24 is in the rearward position to maintain a predetermined angle between lip plate 32 and center plate 24. This allows the second edge 35 of lip plate 32 to be high enough to reach trucks in the upper end of the service range of the dock leveler.

Figure 3B:
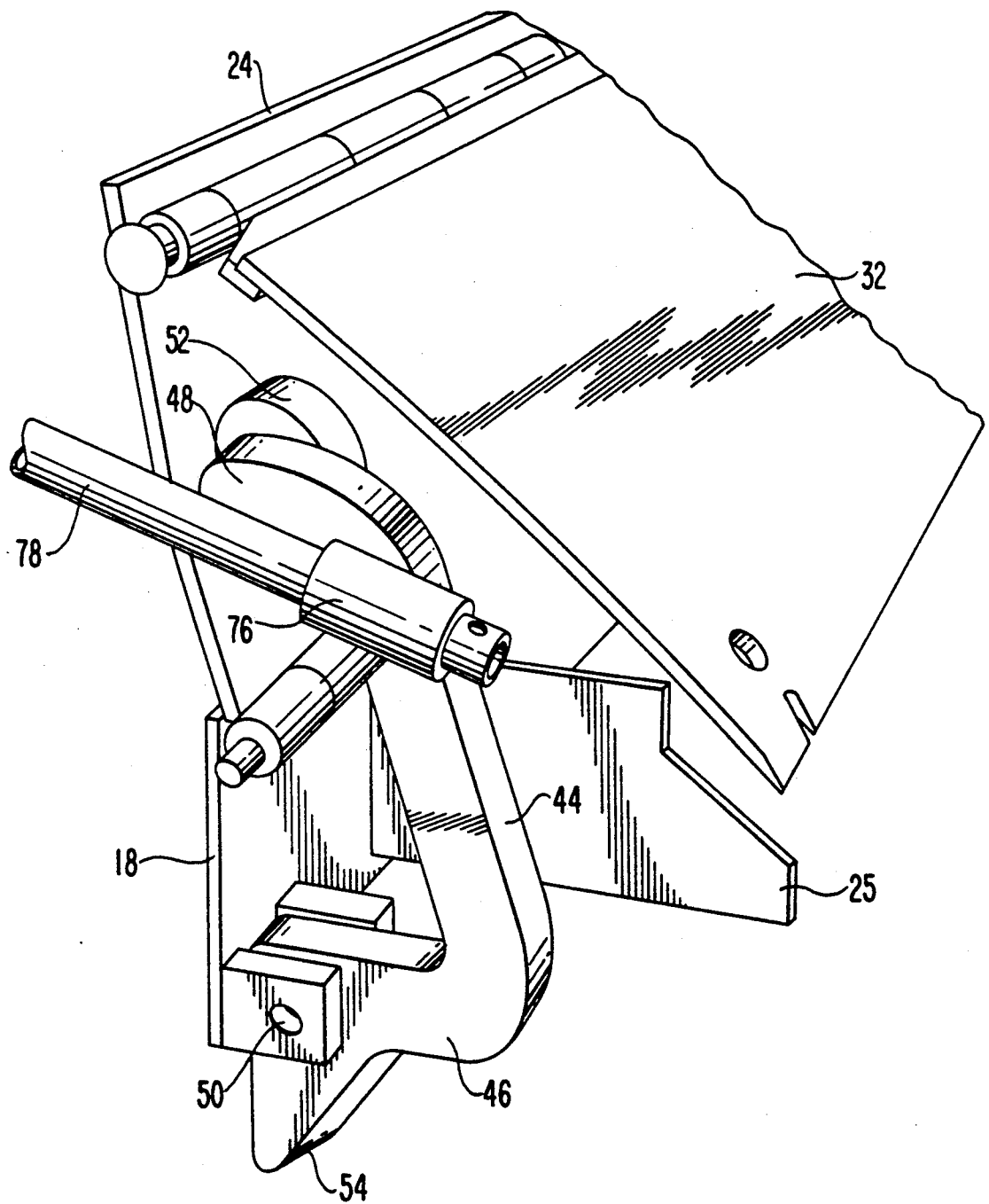
FIG. 3(b) is a perspective view illustrating the position of the operating apparatus of the present invention at times when the dock leveler is in the position shown in FIG. 3(a)
Figure 5A:
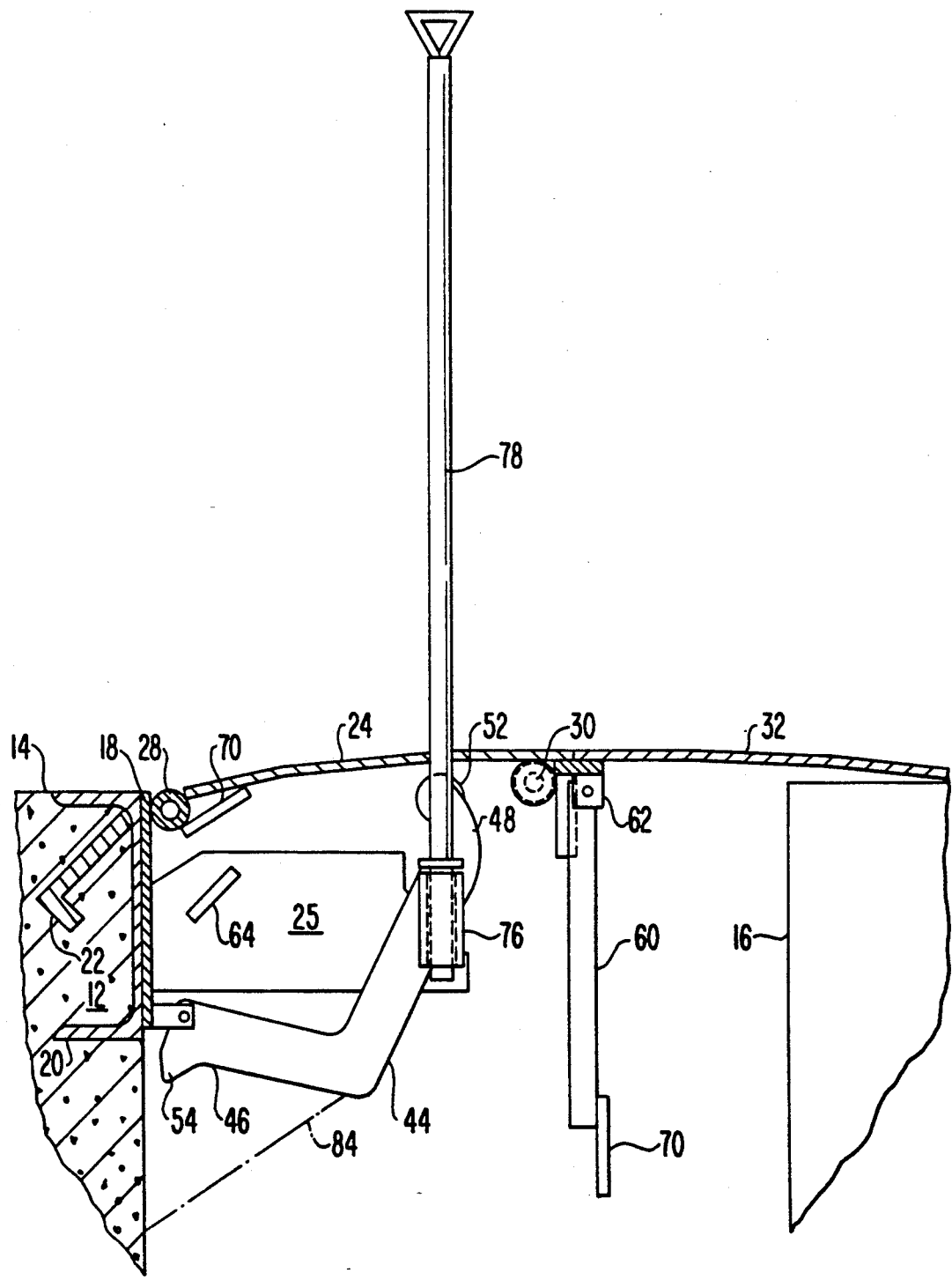
FIG. 5(a) is a sectional side view illustrating the dock leveler shown in FIG. 1 in a bridging position.

As embodied herein, dock leveler 10 includes center plate pivoting means pivotally connected to base plate 18. The position of the center plate pivoting means at times when the dock leveler is in the retracted position is shown in FIG. 3(b). The center plate pivoting means includes a unitary linkage 44 having a first end 46 and a second end 48. First end 46 of the linkage 44 is pivotably connected to base plate 18 by pivot block 50. Second end 48 is adapted to selectively engage center plate 24 and to move between first and second opposite edges 26 and 36, respectively, as the center plate is pivoted from the forward position to the rearward position. As shown in FIGS. 2 and 5(a), the second end 48 of linkage 44 is disengaged from center plate 24 at times when center plate 24 is in the stored and bridging positions.

Figure 6:
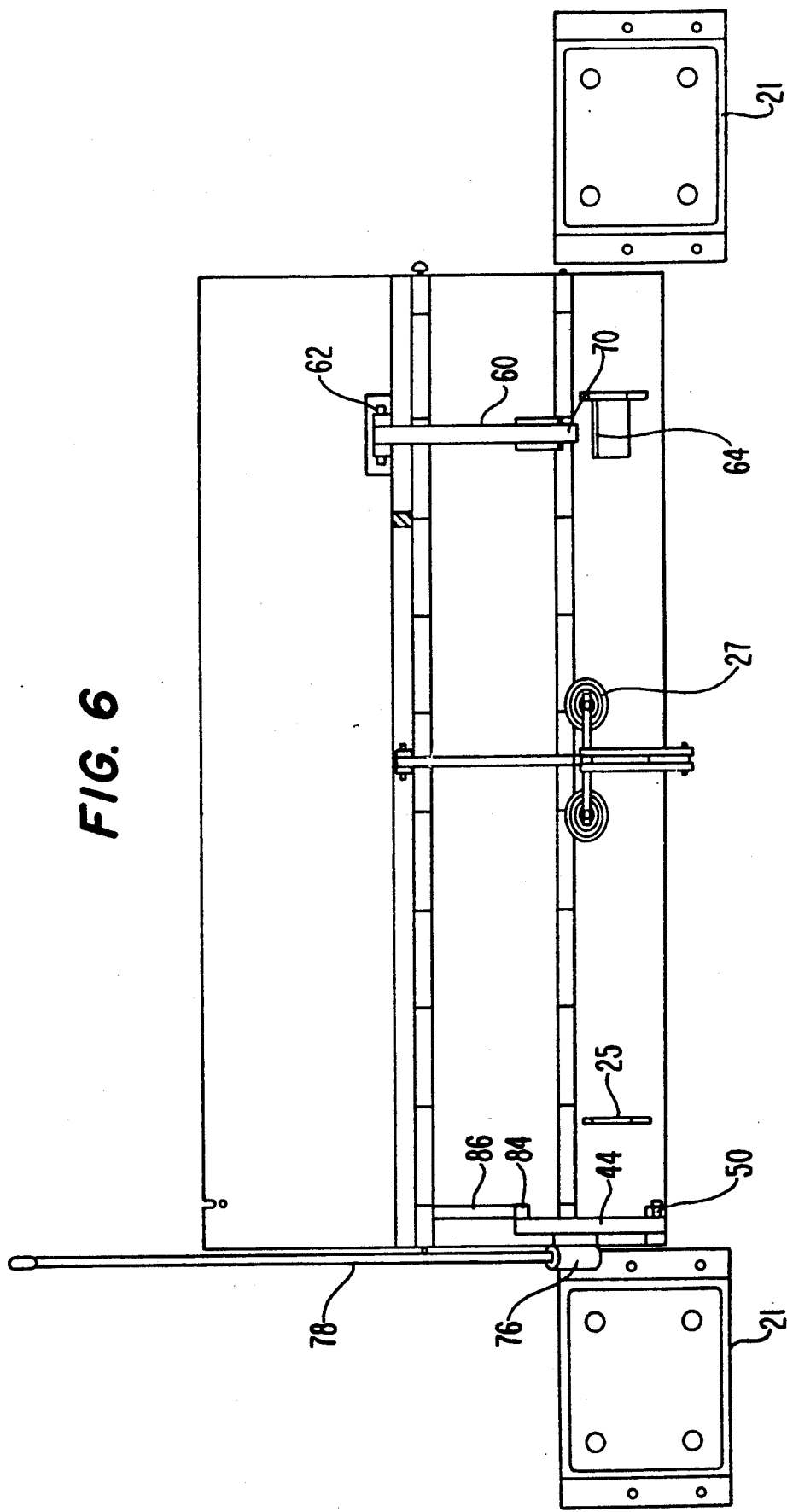
FIG. 6 is a front plan view of the dock leveler in a full upright position made in accordance with a second embodiment of the present invention.

Preferably, second end 48 of linkage 44 includes a roller 52 adapted to roll between first and second opposite edges 26 and 36, respectively, of center plate 24 as the center plate is pivoted from the forward position to the rearward position. It is also contemplated that other means of engaging center plate 24 may also be utilized on second end 48 of linkage 44. For example, it is contemplated that a sliding member may be attached to second end 48 of linkage 44 to slide within a groove on the underside of center plate 24. FIG. 6 schematically illustrates a second embodiment of the center plate pivoting means of the present invention. In the second embodiment, a slide member 86 replaces roller 52 of the first embodiment. Slide member 86 is dimensioned to engage and slide within groove 86 formed on the underside of center plate 24 as the center plate pivots in the rearward direction from its forward position. Slide member 86 can be dimensioned to allow it to disengage groove 84 at selected times.

Preferably, the center plate pivoting means includes manually actuatable means. As embodied herein, the manually actuatable means includes a lever tube 76 connected adjacent to second end 48 of linkage 44. An operating lever 78 is disposed in lever tube 76. In a preferred embodiment, lever 78 is in a substantially vertical orientation at times when center plate 24 is in the stored and bridging positions. This allows the operator to grasp and pull lever 78 rearward without undue back strain and without having to lean over the loading dock. Also, when the center plate 24 is in the retracted position shown in FIG. 3(a), the operating lever is adapted to be approximately 18-24 inches from the ground. This minimizes the amount of bending required by an operator having to grasp lever 78 to move dock leveler 10 from its retracted position. Lever 78 shown in the accompanying drawings is a straight bar.

As shown clearly in FIG. 2, the preferred embodiment of linkage 44 is substantially L-shaped and of unitary construction. First end 46 of linkage 44 includes means for limiting the pivotal movement of linkage 44. Specifically, as shown in FIG. 2, a protrusion 54 provided on first end 46 of linkage 44 engages loading dock 12 at times when the second end 45 is disengaged from center plate 24. Because the downward pivotal movement of linkage 44 is limited by the engagement of protrusion 54 with loading dock 12, the lever tube 76 and lever 78, are maintained in a substantially vertical orientation, thereby making lever 78 safe to grasp by an operator. Other means of limiting the forward pivotal motion of linkage 44 may be utilized to maintain lever tube 76 and operating lever 78 in a substantially vertical orientation.

In accordance with present invention, the dock leveler includes lip extension means for pivoting a lip plate toward the bridging position as the center plate pivots forward from the rearward position. As embodied herein, and as best seen in FIG. 4(a), the lip extension means includes an extension bar 60 and a stop member 64. Extension bar 60 has a first end 61 pivotably connected by pivot block 62 to lip plate 32. Extension bar 60 has a free second end 63 and rod 70 connected adjacent second end 63. Preferably dock leveler 10 includes support gusset 25 connected to base plate 18 and stop member 64 is rigidly connected to support gusset 25.

Figure 4B:
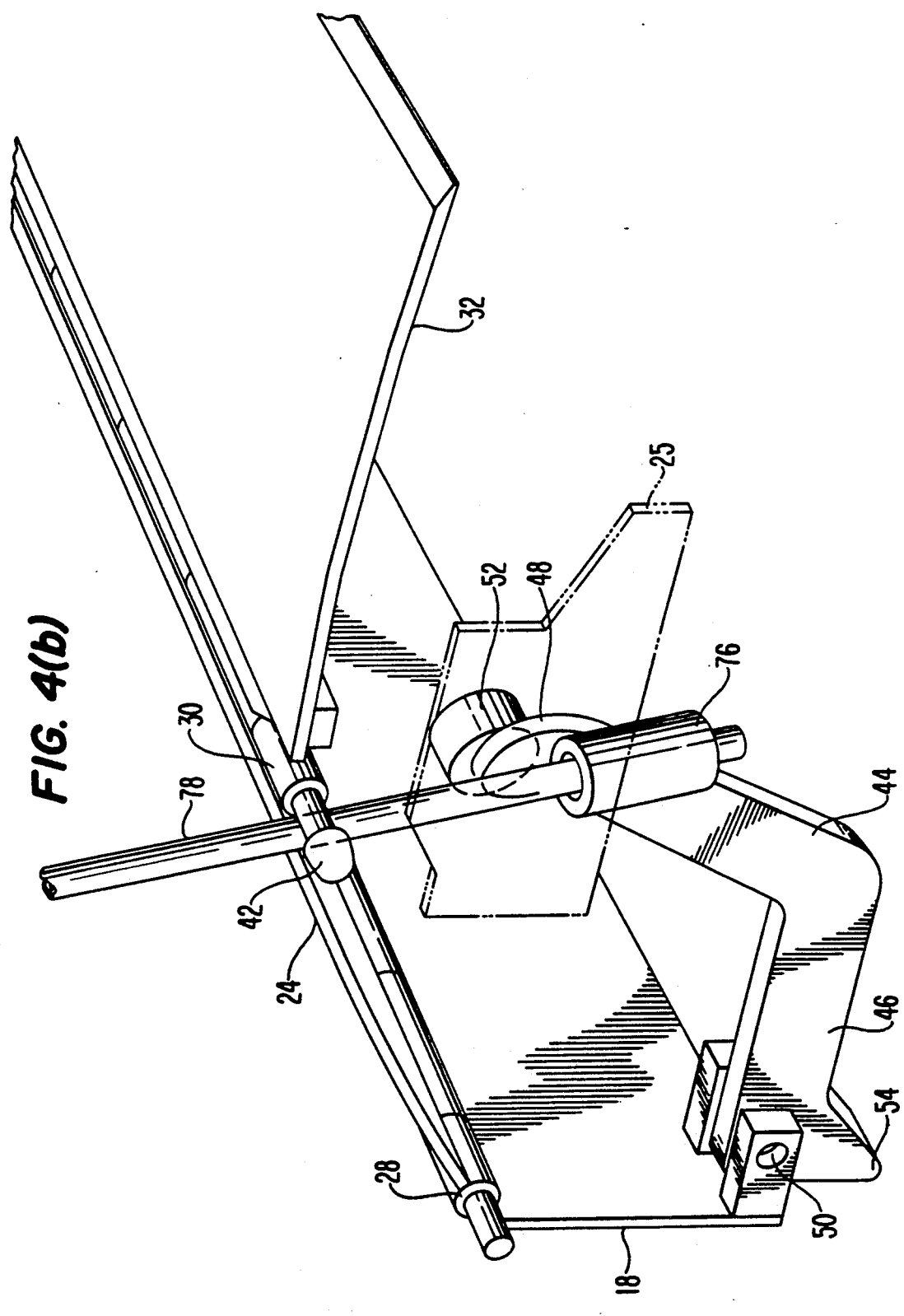
FIG. 4(b) is a perspective view illustrating the position of the operating apparatus of the present invention at times when the dock leveler is in the position shown in FIG. 4(a)

Extension bar 60 is adapted to engage stop member 64 at times when center plate 24 is in the rearward position to pivot the lip plate toward the bridging position as the center plate is pivoted forward from the rearward position. Rod 70 abuts stop member 64 to limit rotation of extension bar 60 and enable free end 63 of extension bar 60 to engage stop member 64. Preferably, stop member 64 includes an angled portion 65 and extension bar 60 disengages from the angled portion in a sear-type action when center plate 24 reaches a predetermined pivotal position. As embodied herein, extension bar 60 disengages from stop member 64 when center plate 24 forms an angle of approximately 40° with the horizontal. FIG. 4(a) illustrates dock 10 as it moves between the retracted position of FIG. 3(a) and the bridging position of FIG. 5(a). FIG. 4(b) illustrates the operating apparatus as the dock leveler moves from the retracted position to the bridging position.

As shown in FIG. 2, a flat safety plate 74 is connected to the underside of center plate 24 to protect hinge 28. Safety plate 74 is approximately 3 inches wide and extends substantially the entire length of hinge 28 to protect the hinge.

The overall operation of the apparatus of the present invention will now be described with reference to the drawings. FIG. 2 illustrates the dock leveler in a stored position. Lever 78 is in a substantially vertical orientation and roller 52 is disengaged from center plate 24. To move the leveler into a bridging position, an operator will grasp lever 78 and pull in a rearward direction. Pulling of lever 78 causes roller 52 to engage the underside of center plate 24 adjacent second edge 36. Continued pulling on lever 78 causes center plate 24 to move to the retracted position shown in FIG. 3(a). During the pivoting of center plate 24, roller 52 rolls along the underside of center plate 24 to a position adjacent first edge 26 of center plate 24. Free end 63 of extension bar 60 engages stop member 64 at times when center plate 24 is in the rearward position and lip plate 32 is in the retracted position.

To move the leveler from the position shown in FIG. 3(a) into the bridging or stored positions, an operator will push forward on lever 78 from the position shown in FIG. 3(a). This causes roller 52 to move in a forward direction disengaging from center plate 24. Lever 78 will engage rivet 42 disposed on hinge tube 30 to pivot center plate 24 forward. Alternatively, the operator may use another means to pivot center plate 24. Such other means could include manual force, such as kicking the center plate forward. As the center plate 24 pivots forward, the engagement of extension bar 60 and stop member 64 causes the lip plate 32 to pivot toward the bridging position. FIG. 4(a) illustrates the positioning of the apparatus just before extension bar 60 disengages from stop member 64 in a sear-type action.

The apparatus of this invention renders the operator less susceptible to back injuries. The operator lifts lever 78 from its rearward position in which it is approximately 18-24 inches from the ground until lever 78 strikes rivet 42 in hinge 30 before the center or lip plates begin to pivot. Thus, the initial pivoting motion of lever 78 is substantially a non-weight bearing action. That is, only the weight of the operating lever itself is initially moved. The center plate 24 is not moved until operating lever 78 is raised to a point where the operator is not bending over. Such a system reduces the possibility of a back injury to the operator.

To even further reduce the possibility of back injury to an operator, it is contemplated that a biasing means could be utilized to urge linkage 44 in the forward direction from the position shown in FIG. 3(a) to the position shown in FIG. 2. Such biasing means could comprise a spring attached at a first end to the loading dock or base plate and attached at a second end to linkage 44. Such a spring is shown in phantom lines in FIG. 5(a) and is identified with the reference numeral 84. Such a biasing means would urge the linkage from the position shown in FIG. 3(a) once the operator releases lever 78. The pivoting of linkage 44 would cause lever 78 itself to pivot forward a predetermined amount. This would raise the lever relative to the ground and reduce the amount of bending required by an operator to grasp the lever.

It will be apparent to those skilled in the art that various modifications and variations can be made in the dock leveler operating apparatus of present invention without departing from the scope or spirit of the present invention. Thus, it is intended that the present invention covers the modifications and variations of the invention which come within the scope of the appended claims and their equivalents.

What is claimed is:

1. A dock leveler for bridging a gap between a loading dock and a carrier bed, comprising:
   a base plate to be attached to the loading dock;
   a center plate having a first and second opposite edges, said first edge pivotally connected to the base plate for pivotal movement in rearward and forward directions between a rearward position and a forward position;
   a lip plate having first and second opposite edges, the first edge of the lip plate pivotally connected to the second edge of the center plate for pivotal movement between a retracted position, a stored position, and a bridging position in which the lip plate is substantially coplanar with and forms an extension of the center plate;
   center plate pivoting means pivotally connected to the base plate for pivoting the center plate from the forward position to the rearward position; and
   lip extension means for pivoting the lip plate toward the bridging position as the center plate pivots forward from the rearward position;
   wherein the center plate pivoting means includes a linkage having a first and second end, said first end being pivotally connected to the base plate, said second end having means for selectively moving along the center plate in engagement therewith in a region between the first and second opposite edges of the center plate as the center plate is pivoted from the forward position to the rearward position.

2. The dock leveler of claim 1, wherein the second end of the linkage is adapted to disengage from the center plate as the center plate is pivoted to the forward position.

3. The dock leveler of claim 2, wherein the first end of the linkage includes means for limiting pivotal movement of the linkage.

4. The dock leveler of claim 3, wherein the limiting means includes a protrusion at the first end of the linkage for engaging the loading dock.

5. The dock leveler of claim 1, wherein the center plate pivoting means includes manually actuatable means, said manually actuatable means comprising a lever tube connected adjacent the second end of the linkage and an operating lever disposed in said lever tube.

6. The dock leveler of claim 5, wherein the lever is in a substantially vertical orientation at times when the center plate is in the forward position.

7. The dock leveler of claim 1, wherein the second end of the linkage includes a roller adapted to roll between the first and second opposite edges of the center plate as the center plate is pivoted in the rearward direction from the forward position.

8. The dock leveler of claim 1, wherein the second end of the linkage includes means for sliding between the first and second opposite edges of the center plate as the center plate is pivoted in the rearward direction from the forward position.

9. The dock leveler of claim 1, wherein the linkage is unitary and is substantially L-shaped.

10. The dock leveler of claim 1, further comprising a support gusset connected to the base plate, wherein the lip extension means includes an extension bar having a first end pivotably connected to the lip plate and a stop member attached to the support gusset, said extension bar includes a free second end adapted to engage the stop member when the center plate is in the rearward position to pivot the lip plate toward the bridging position as the center plate is pivoted forward from the rearward position.

11. The dock leveler of claim 10, wherein the second end of the extension bar is adapted to disengage from the stop member after the center plate is pivoted forward a predetermined distance from the rearward position.

12. The dock leveler of claim 11, wherein the stop member includes an angle portion and the extension bar is adapted to disengage from said angled portion in a sear-type action.

13. The dock leveler of claim 3, further comprising a stop bar connected to the lip plate, said stop bar adapted to engage the center plate at times when the center plate is in the rearward position to maintain a predetermined angle between the center plate and the lip plate.

14. The dock leveler of claim 13, wherein the predetermined angle is approximately 60°.

15. The dock leveler of claim 3, further comprising a biasing means for urging the linkage in a forward direction.

16. An apparatus for operating a dock leveler having a base plate attached to a loading dock, a center plate pivotally connected to the base plate for pivotal movement in rearward and forward directions between a full rearward position and a forward position, and a lip plate pivotally connected to the center plate for pivotal movement between a retracted position, a stored position, and a bridging position in which the lip plate is substantially coplanar with and forms an extension of the center plate, the apparatus comprising:

center plate pivoting means pivotally connected to the base plate for pivoting the center plate from the forward position to the rearward position; and lip extension means for pivoting the lip plate toward the bridging position as the center plate pivots forward from the rearward position;

wherein the center plate pivoting means includes a linkage having a first and second end, said first end being pivotally connected to the base plate, said second end having means for selectively moving along the center plate in engagement therewith in a region between the first and second opposite edges of the center plate as the center plate is pivoted from the position to the rearward position.

17. The apparatus of claim 16, wherein the second end of the linkage is adapted to disengaged from the center plate as the center plate is pivoted to the forward position.

18. The apparatus of claim 16, wherein the first end of the linkage includes means for limiting pivotal movement of the linkage.

19. The apparatus of claim 17, wherein the center plate pivoting means includes manually actuatable means, said manually actuatable means comprising a lever tube connected adjacent the second end of the linkage and an operating lever disposed in said lever tube, said operating lever being in a substantially vertical orientation at times when the center plate is in the forward position.

20. The apparatus of claim 17, wherein the second end of the linkage includes a roller adapted to roll between the first and second opposite edges of the center plate as the center plate is pivoted in the rearward direction from the forward position.

21. The apparatus of claim 18, further comprising a biasing means for urging the linkage in the forward direction.

* * * * *

UNITED STATES PATENT AND TRADEMARK OFFICE
CERTIFICATE OF CORRECTION

PATENT NO. : 5,195,205
DATED : March 23, 1993
INVENTOR(S) : BOBBY A. COOK

It is certified that error appears in the above-identified patent and that said Letters Patent is hereby corrected as shown below:

Claim 7, column 8, lines 16-17, "the second end of the linkage" should be --the means for selectively moving--.

Claim 10, column 8, line 32, "pivotably" should be --pivotally--.

Claim 12, column 8, line 45, "angle" should be --angled--.

Claim 16, column 9, line 12, "the first and second opposite edges" should be --a first edge and a second edge opposite the first edge--;

column 9, line 14, after "from the", insert --forward--.

Claim 17, column 9, line 16, "disengaged" should be --disengage--.

Signed and Sealed this

First Day of February, 1994

*Attest:*

BRUCE LEHMAN

*Attesting Officer*  *Commissioner of Patents and Trademarks*